United States Patent [19]

Takahashi et al.

[11] Patent Number: 4,755,938
[45] Date of Patent: Jul. 5, 1988

[54] ACCESS REQUEST CONTROL APPARATUS WHICH REASSIGNS HIGHER PRIORITY TO INCOMPLETE ACCESS REQUESTS

[75] Inventors: Masanori Takahashi; Hidehiko Nishida, both of Tokyo; Minoru Koshino; Akira Hattori, both of Yokohama, all of Japan

[73] Assignee: Fujitsu Limited, Kawasaki, Japan

[21] Appl. No.: 920,946

[22] Filed: Oct. 20, 1986

Related U.S. Application Data

[63] Continuation of Ser. No. 505,955, Jun. 20, 1983, abandoned.

[30] Foreign Application Priority Data

Jun. 18, 1982 [JP] Japan ................. 57-104736

[51] Int. Cl.⁴ .................. G06Z 13/18; G06Z 9/38
[52] U.S. Cl. ..................... 364/200; 340/825.5
[58] Field of Search ............. 364/200, 900 MS File; 340/825.5, 825.51

[56] References Cited

U.S. PATENT DOCUMENTS

| | | | |
|---|---|---|---|
| 3,377,579 | 4/1968 | Wissick et al. | 364/200 |
| 3,643,218 | 2/1972 | Gramwinckel | 364/200 |
| 3,866,181 | 2/1975 | Gayman et al. | 364/200 |
| 3,925,766 | 12/1975 | Bardotti et al. | 364/200 |
| 3,984,820 | 10/1976 | Stanley et al. | 364/200 |
| 4,028,663 | 6/1977 | Royer et al. | 364/900 |
| 4,106,718 | 8/1978 | Poublan et al. | 364/200 |
| 4,152,764 | 5/1979 | Connors et al. | 364/200 |
| 4,257,095 | 3/1981 | Nadir | 364/200 |
| 4,272,815 | 6/1981 | Kadowaki et al. | 364/200 |
| 4,326,250 | 4/1982 | McCullough | 364/200 |
| 4,443,848 | 4/1984 | Gehman | 364/200 |
| 4,445,171 | 4/1984 | Neckes | 364/200 |
| 4,459,664 | 7/1984 | Pottier et al. | 364/200 |
| 4,470,111 | 9/1984 | Jenkins et al. | 364/200 |
| 4,481,583 | 11/1984 | Mueller | 364/200 |
| 4,482,949 | 11/1984 | Cates | 364/200 |
| 4,511,959 | 4/1985 | Nicolas et al. | 364/200 |
| 4,547,848 | 10/1985 | Nishida et al. | 364/200 |

FOREIGN PATENT DOCUMENTS 57-164338 10/1982 Japan.
WO81/02210 8/1981 PCT Int'l Appl..

OTHER PUBLICATIONS

Christensen: "Programmable Priority Mechanism", IBM TDB, vol. 17, No. 7, 12/1974, pp. 2052-2053.
Microprocessor and Firmware, Seventh Euromicro Symposium on Microprocessing and Microprogramming, "A Distributed Virtual Support Information Exchange System", pp. 36-41, Sep. 81.

*Primary Examiner*—Archie E. Williams, Jr.
*Assistant Examiner*—Thomas C. Lee
*Attorney, Agent, or Firm*—Staas & Halsey

[57] ABSTRACT

The present invention relates to an access request control apparatus and more specifically to an apparatus for determining priority between a plurality of access requests in a memory control apparatus which uses a pipeline. One of the access requests from a plurality of channel processing devices CHP's is selected by a first priority determination circuit. The selected CHP request, the requests from a plurality of central processing units and the request in the loop-back of the pipeline control circuit are considered for selection by a second priority determination circuit. In case a CHP request, selected by the first priority determination circuit, is not selected by the second priority determination circuit or selected but nullified in the course of the pipeline, the CHP request is returned to the first priority determination circuit. But, in this case, a higher priority is given to the CHP request in the first priority determination circuit. In addition, the priority algorithm in the second priority determination circuit considers the kinds of operations of each access request and highly efficient memory access control can be realized.

20 Claims, 6 Drawing Sheets

ACCESS REQUEST CONTROL APPARATUS WHICH REASSIGNS HIGHER PRIORITY TO INCOMPLETE ACCESS REQUESTS

This is a continuation of co-pending application Ser. No. 505,955 filed on June 20, 1983, now abandoned.

BACKGROUND OF THE INVENTION

This invention relates to an access request control apparatus in a data processing system and more specifically to the determination of priority between a plurality of access requests, and more particularly to a processing system of memory access requests from central processing units (CPU's) and channel processing units (CHP's).

FIG. 1 is an example of a structure of a data processing system to which the present invention is applied. In this figure, blocks 1 and 2 are two central processing units $CPU_0$ and $CPU_1$, respectively; blocks 3 and 4 are four channel processing units $CHP_0$ to $CHP_3$; block 5 is a memory control unit MCU for the pipeline system 17; and block 6 is a memory unit MSU. Block 7 is a buffer memory BS, for example, of a set associative system. Block 8 is a directory to be used for controlling the buffer memory BS 7. Block 9 is a priority determination circuit. Block 10 is a pipeline 17 consisting of multistage registers.

The MCU 5 accepts the access requests for access to the MSU 6 at any time from any of the $CPU_0$ 1, $CPU_1$ 2, $CHP_0$ 3, . . . , $CHP_3$ 4 and executes memory control based on the buffer system, using the directory 8 and the buffer memory BS 7. Memory control by the buffer system means that the directory 8 is searched whether the data block to which an access request has been issued is or is not in the BS 7. When the data block exists in the BS 7, an access is carried out to the BS 7, but if it does not exist in the BS 7, access is made to the MSU and the pertinent block is loaded into the BS 7. When a plurality of access requests are accepted simultaneously by a conventional system, the priority determination circuit selects one access request according to a constant priority determination formula and the selected access request is executed.

The priority determination system for access requests can be summarized as follows. Between CHP and CPU, the CHP is given a higher priority. Between CPU and CPU, priority is determined in accordance with the priority determination formula for each unit. An access request from the loop-back (described later) should have the highest priority (see for example, Japanese laidopen Pat. No. 164338/1982 published 10/8/1982).

The operation of the priority determination system will now be outlined. The MCU 5 determines the priority when it accepts the access requests from a plurality of CHP's and CPU's and executes pipeline processing for the accepted access requests. First, priority is determined between CHP's in order to select one access request. Second, priority is determined between the selected CHP access request, access requests from a plurality of CPU's and a loop-back access request which is passing through the pipeline 17 again. As a result, one access request is selected. Thereafter, the selected access requests are sequentially input to the pipeline 17 in order to be executed.

A CHP access request, once it has been selected by the first priority determination process, may have its priority nullified in one of four ways:

(1) If the CHP access request and an access request sent from the loop-back are both present during the second priority determination step, the loop-back access request must obtain the highest priority in order to use the pipeline 17 again. Accordingly, since the priority of the loop-back access request is set higher than the CHP access request, the CHP access request cannot obtain the highest priority and the priority acquired in the first priority determination step is nullified.

(2) When the bank of buffer memory BS 7 to be used by the CHP access request is in use by another access request being processed by the MCU 5 or the signal for inhibiting access by the requesting CHP unit is being generated, the priority determined by the first priority determination step is nullified.

(3) When the data to be accessed by the access request is not in the buffer memory BS 7 (BUFFER NOT FOUND), after the CHP access which has obtained priority in the second priority determination is input to the pipeline, the main memory must be accessed. If it is detected that the main memory access port is in the busy state, the access request is nullified.

(4) When the set address of the buffer memory BS 7 used by the preceding access request is found to be the same as that of the CHP access request, set conflict occurs and the CHP access request is inhibited, nullified and started again from the first priority determination step.

A CHP access request which has been nullified and started again from the first priority determination step competes with other CHP access requests. Therefore, a CHP access request which should have been processed earlier may sometimes be delayed by later CHP access requests. Here arises a problem in that the access time of the CHP access request which should have been processed earlier is further increased due to a series of CHP access requests received later by the MCU 5.

On the other hand, a CHP access request which has had its priority nullified during the second priority determination step is not started again from the first priority determination step but is held until priority can be obtained in the second priority determination step. In this case, hardware for holding access requests which have had their priority nullified is necessary and a control circuit is necessary for determining whether a new CHP access request or a waiting CHP access request should take part in the second priority determination step.

The first and second priority determination logic in the existing system described above is not sufficiently flexible. The access requests which the MCU 5 processes include those which require repeated operations, like a block access request, and those from the loop-back having a comparatively low priority, like a prefetch request, or a comparatively high priority like an error processing request. In the existing priority determination system described above, the differences are all ignored and therefore processing is sometimes performed inefficiently.

SUMMARY OF THE INVENTION

It is an object of the present invention to raise the priority of a CHP access request which has had its priority nullified when it again takes part in the first priority determination step, so that it overcomes other CHP access requests in the first priority determination step, thereby minimizing the processing time of a CHP access request which has had its priority nullified.

It is a another object of the present invention to improve the efficiency of access request processing by executing priority determination more precisely than the existing method by providing a control system for modifying the priority in accordance with the type of access request on the basis of a comparatively uniform priority determination formula implemented by hardware.

The above objects are attained by providing an access request control apparatus comprising accepting means for accepting access requests from access requesting apparatuses and determining means for determining priority of received access requests and increasing the priority of any nullified access requests.

DESCRIPTION OF THE PREFERRED EMBODIMENT

Figure 1:
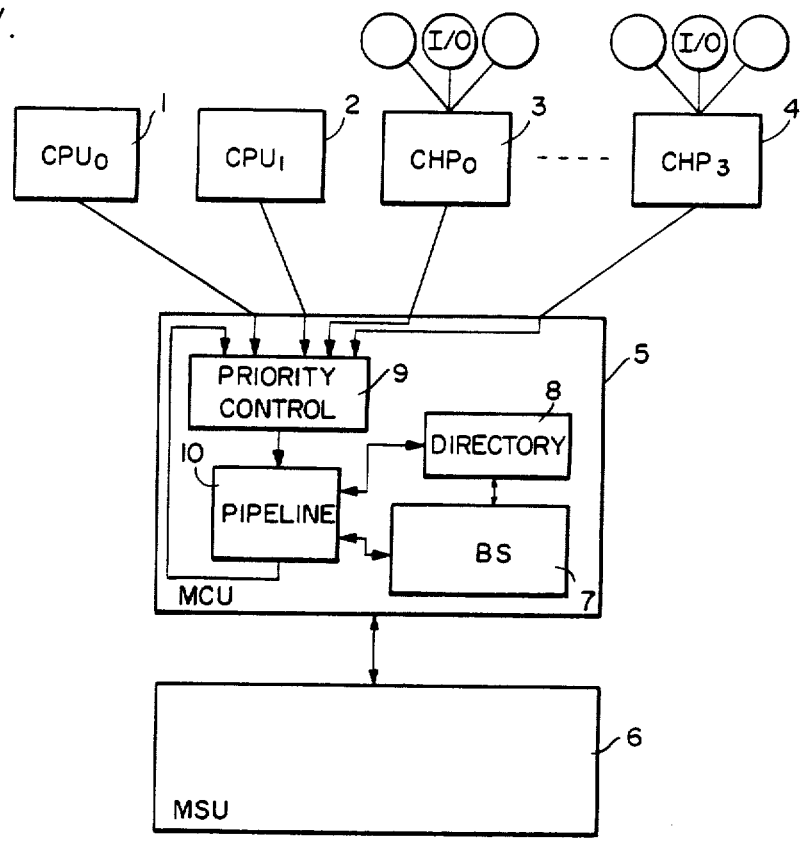
FIG. 1 is a system configuration of a data processing system to which the present invention is applied.
Figure 2:
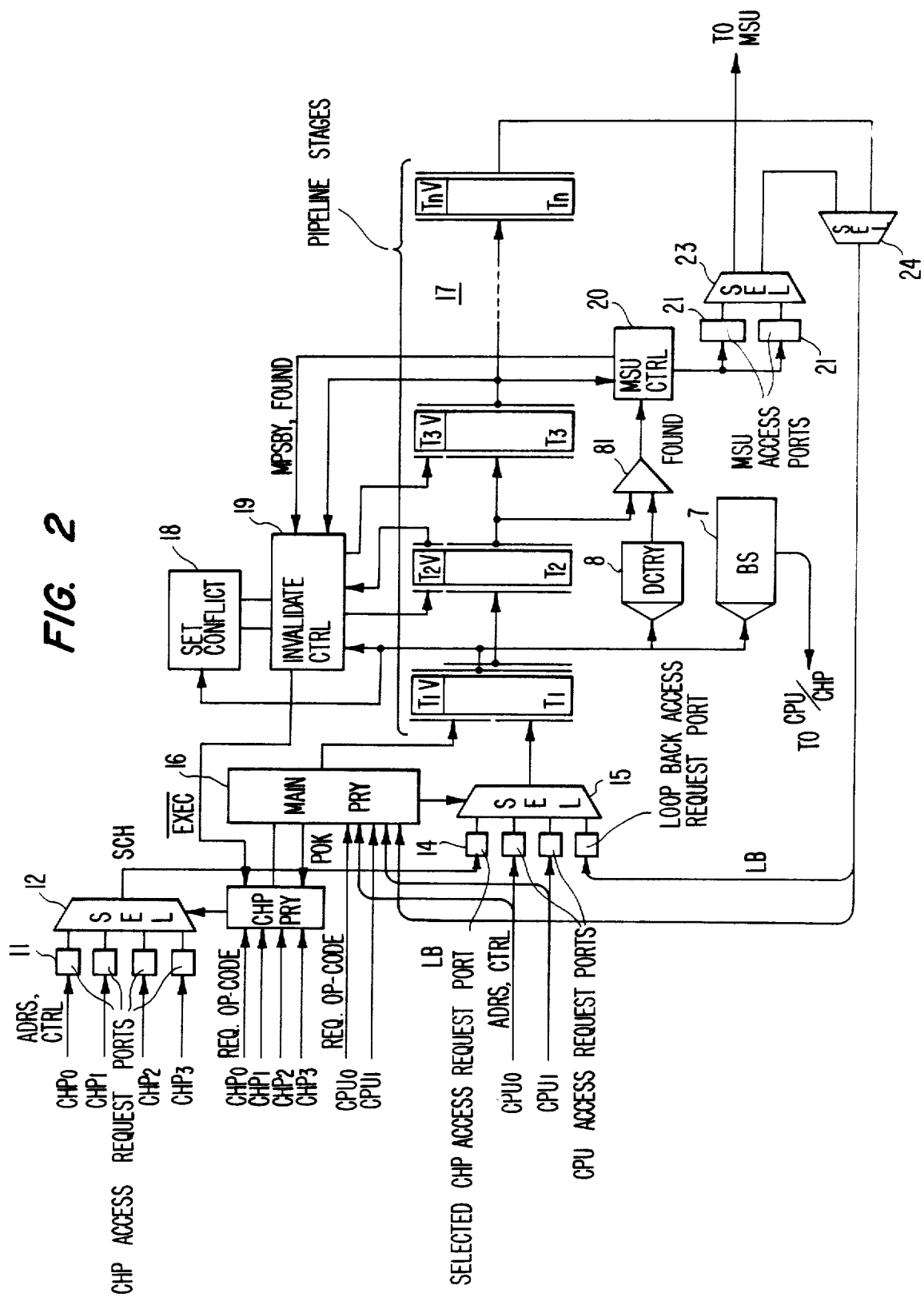
FIG. 2 is a block diagram of the major parts of an embodiment of the memory control unit MCU 5 (FIG. 1) to which the present invention is applied.

FIG. 2 illustrates part of the structure of an embodiment of the memory control unit MCU 5 (FIG. 1) to which the present invention is applied. In this figure, only the circuit related to the present invention is extracted for the convenience of explanation.

In this figure, 11 is a CHP port (register), accepting the address and control signals sent from $CHP_0$ through $CHP_3$. Block 12 is a CHP selector which is controlled by the CHP priority determination circuit 13. The CHP priority determination circuit 13 selects one access request signal REQ from among the access request signals REQ's from $CHP_0$ 3 through $CHP_3$ 4 and then outputs the REQ signal of the selected CHP (indicated as SCH) for further priority determination with other access requests. The circuit 13 includes state indication registers for each CHP and thereby the processing condition of the access requests from each CHP, and the busy condition of their ports are indicated. These registers will be explained in detail later.

Block 14 is a CPU port, accepting addresses and control signals sent from $CPU_0$ 1, $CPU_1$ 2, the selected channel processing unit SCH and the loop-back LB. Block 15 is a CPU selector controlled by the main priority determination circuit 16 which determines the priority of REQ signals sent from the $CPU_0$ 1, $CPU_1$ 2, SCH and LB which are all input to the CPU selector 15. The signal $\overline{POK}$ is output from the circuit 16 to the circuit 13 to indicate that the SCH was not selected. Block 17 is a pipeline consisting of the multistaged registers $T_1, T_2, \ldots, T_n$ and $T_1V, T_2V, T_3V, \ldots, T_nV$ are validity bits in each stage.

Block 18 is a circuit having a set conflict detecting function. Block 19 is a nullification control circuit which detects a disable condition for an access request in the pipeline 17 and nullifies it. When the above circuits 18 and 19 indicate the processing continuation disable (NULLIFY) condition, the validity bit is inverted and the execution disable signal $\overline{EXEC}$ is output.

Various basic priority determination formulas for the CHP priority determination circuit 13 can be conceived. For example, setting initial priority according to the port number, using a predetermined sequence or a cyclicly changed sequence, may be employed. To such various priorities, the raising of the priority of access requests which have been nullified, using the $\overline{POK}$ or $\overline{EXEC}$ signal, is added. The priority determination formula of the main priority determination circuit 16 includes the rule that the priority follows the sequence CPU < SCH < LB and also considers the value of hot and cold flags between the CPU's.

Block 81 is a comparison circuit which detects whether the data requested is in the directory. If there is such data, it generates an output FOUND. Block 20 is an MSU access control circuit which sends the access request to an MSU access port 21 when FOUND is "0". Moreover, when the MSU ports 21 are all busy, the signal MP BSY is sent to the nullification control circuit 19. Block 23 is a selector which selects an MSU port 21 and sends the access request being held to the MSU 6 (FIG. 1). Block 24 is a selector which selects the access request for the MSU 6 or the access request from the final stage $T_n$ of the pipeline 17 and then loops it back to the CPU port 14.

At the time of the access to the MSU 6, for example, a move-in to BS 7 from MSU 6, when data is sent from the MSU 6 it must be written into the BS 7 and such operation must also be controlled by the pipeline 17. Therefore, the access request generating an access to an MSU 6 must be input again to the pipeline 17. Moreover, in the case of a block fetch request for which data is FOUND, since the number of bytes to be transferred by a single access to the BS 7 is limited to only n bytes, for example, 8 bytes, the access to the BS 7 must be requested many times. In such a case, the access request must be input again to the pipeline 17 from the pipeline's final stage.

Figure 3:
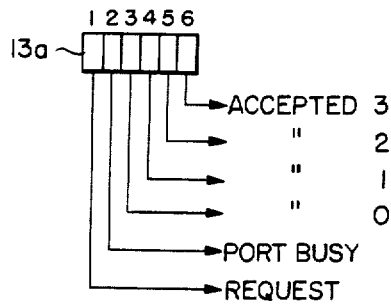
FIG. 3 is a schematic representation of the information stored in a state indication register.

The priority determination process control system for the priority nullification of access requests in the CHP priority determination circuit 13 according to the present invention will be explained by referring to FIG. 3 through FIG. 5 on the basis of the configuration in FIG. 2. FIG. 3 is an example of a structure of one state indication register 13a which is provided in the CHP priority determination circuit 13 in order to control CHP access requests from a corresponding CHP. The first bit indicates "1" (REQUEST) when an access request is issued by the corresponding CHP. The second bit indicates that the access request is accepted and the priority determination process is being executed and the pipeline processing is also being executed and therefore the CHP port 11 is busy (PORT BUSY). The third bit through the sixth bit are condition codes indicating the control status of priority determination processing and pipeline processing for the accepted access request (ACCEPTED 0, 1, 2, 3).

Figure 4:
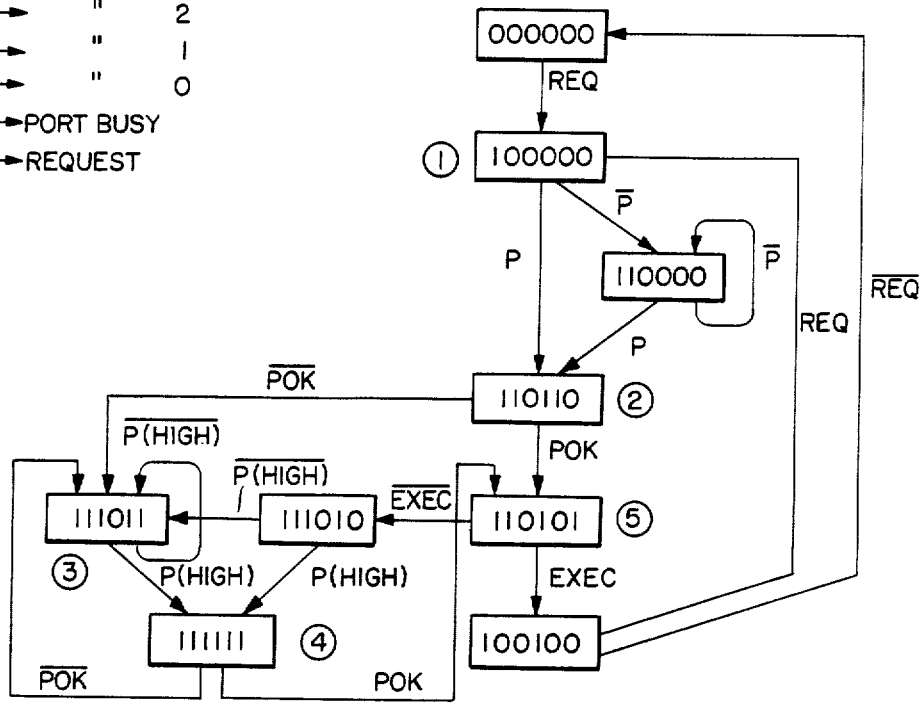
FIG. 4 is a state diagram illustrating the processing of a CHP access request.

FIG. 4 illustrates the transition of the state indication register 13a shown in FIG. 3 and a total of nine states are included. First, the register 13a is in the reset state of [000000]. When the access request REQ is accepted by the CHP port 11, it moves to [100000]. At this point, the first priority determination processing (first phase) is carried out in the CHP priority determination circuit 13. When the priority is determined here, namely the access request is selected (P), the state of the register 13a moves to [110110]. If the access request is not selected (P), the register waits for selection in the state of [110000].

The CHP access request selected in the CHP priority determination circuit 13 then takes part in the second priority determination processing (second phase) in the main priority determination circuit 16. When the access request is selected therein (POK), the state moves to [110101] and when it is executed (EXEC), the states moves to [100100]. If the next access request is accepted after the execution (REQ), the state returns to [100000]. However, if the next access request is not accepted ($\overline{REQ}$), the state returns to [000000].

On the other hand, if the CHP access request is not selected during the second phase ($\overline{POK}$), the state moves to [111011] which has a higher priority. Once the access request is selected during the first phase (P (HIGH)), the state becomes [111111] and the access request again enters the second phase. When the access request is selected here (POK), the state moves to [110110] again and is executed. However, if it is not selected ($\overline{POK}$), state returns to [111011] and the selection is started again from the first phase and is repeated until selected in the second phase (POK).

If, after being selected in the second phase and becoming executable [110101] the CHP access request beomes not excutable ($\overline{EXEC}$), the state moves to [111010]. A high priority is received in the first phase (P (HIGH)) and therefore, when it is selected, the access request moves to the state [111111] in the second phase. Successive processings are the same as above.

If the access requests from three or more CHP's exist in the MCU 7 and the continuous access request execution is disabled (NULLIFY), priority determination will have to be executed from the first phase repeatedly. The access requests which are given high priority (P (HIGH)) will compete and accordingly some access request(s) may not be selected ($\overline{P\ (HIGH)}$). But, in this case, since a high priority is still given (P HIGH) to the access request(s) not selected, they soon will be selected (P (HIGH)) and receive the processing of the second phase. The transistion of states indicated in the situation above is as follows. When a high priority access request is not selected the state moves to [111011] from [111010] without selection ($\overline{P\ (HIGH)}$), or the state remains at [111011] without selection ($\overline{P\ (HIGH)}$), as illustrated in FIG. 4. As explained above, even if priority is nullified in the priority determination processings, an access request may be immediately selected when it returns to the first phase.

Figure 5:
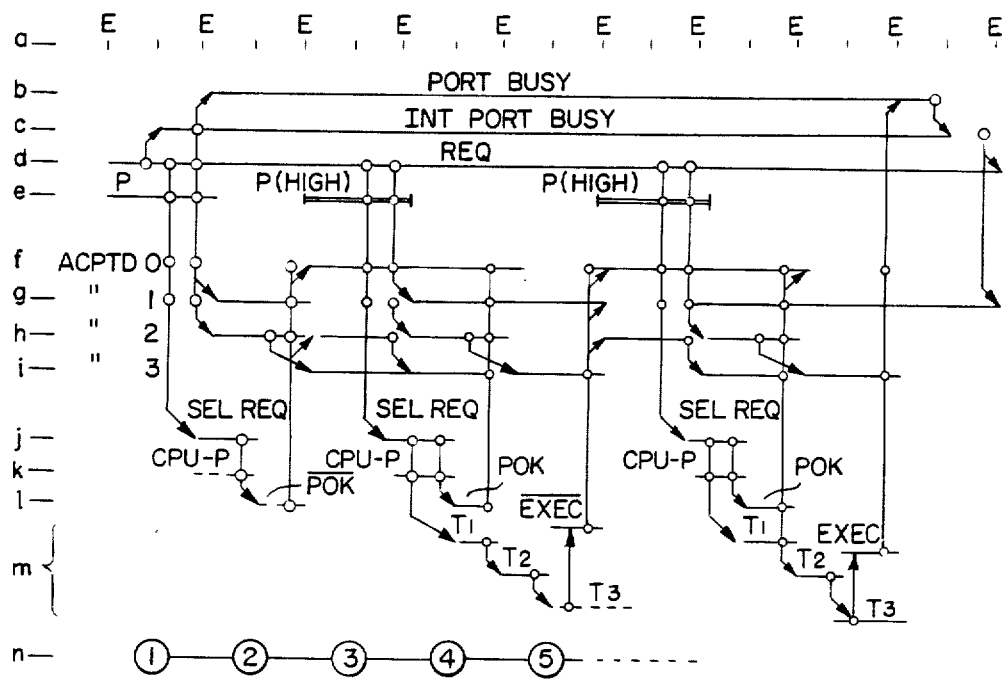
FIG. 5 consisting of $a-n$, is a timing diagram of the processing of an access request following the state transitions illustrated in FIG. 4.

FIG. 5 is a timing diagram of the processing of an access request which generates the state transitions illustrated in FIG. 4. It also depicts the control signals based on the generated state indications.

In FIG. 5, line a is a clock signal and E-E is the clock period of a CHP. The clock period of the CPU's and MCU 7 is ½ of the CHP clock. Line b is a port busy signal. Line c is the port busy signal in the MCU 7. Line d is the access request signal REQ. Line e is the priority P or (P HIGH) signal appearing in the first phase. Lines f to i comprise the state code ACPTD 0 through ACPTD 3. For the above signals and codes, a solid line indicates "1" while a blank indicates "0".

Continuing in FIG. 5, line j is the processing result of the CHP priority determination circuit 13 in the first phase and SEL REQ indicates the REQ has been selected. Line k indicates the processing result CPU-P of the main priority determination circuit 16 in the second phase. The dotted line indicates a result of negation, while the solid line indicates a result of acknowledgement. Line l indicates the presence of the output signal POK or $\overline{POK}$, while m indicates operating conditions of the pipeline 17 in accordance with the level of the output signal POK. Line n contains symbols corresponding to those in FIG. 4.

The small circles in FIG. 5 indicate the logical conditions input to control operations. The result of combining these in the vertical direction are indicated by the arrow marks. For example, at time ①, SEL REQ is output if the input conditions are REQ="1", P="1", ACPTD 0="0", ACPTD 1="0", and simultaneously, "1" is put in ACPTD 1 and 2. At time ②, the $\overline{POK}$ signal is generated from the condition, SEL REQ="1" and CPU-P="0". In other words, from the non-selecting condition in the second phase (CPU-P="0") and the state code is generated the $\overline{POK}$ and state code. At time ⑤, the execution becomes disabled in the $T_3$ stage of the pipeline 17, the $\overline{EXEC}$ signal is generated and the state code is updated to [1010].

Figure 6:
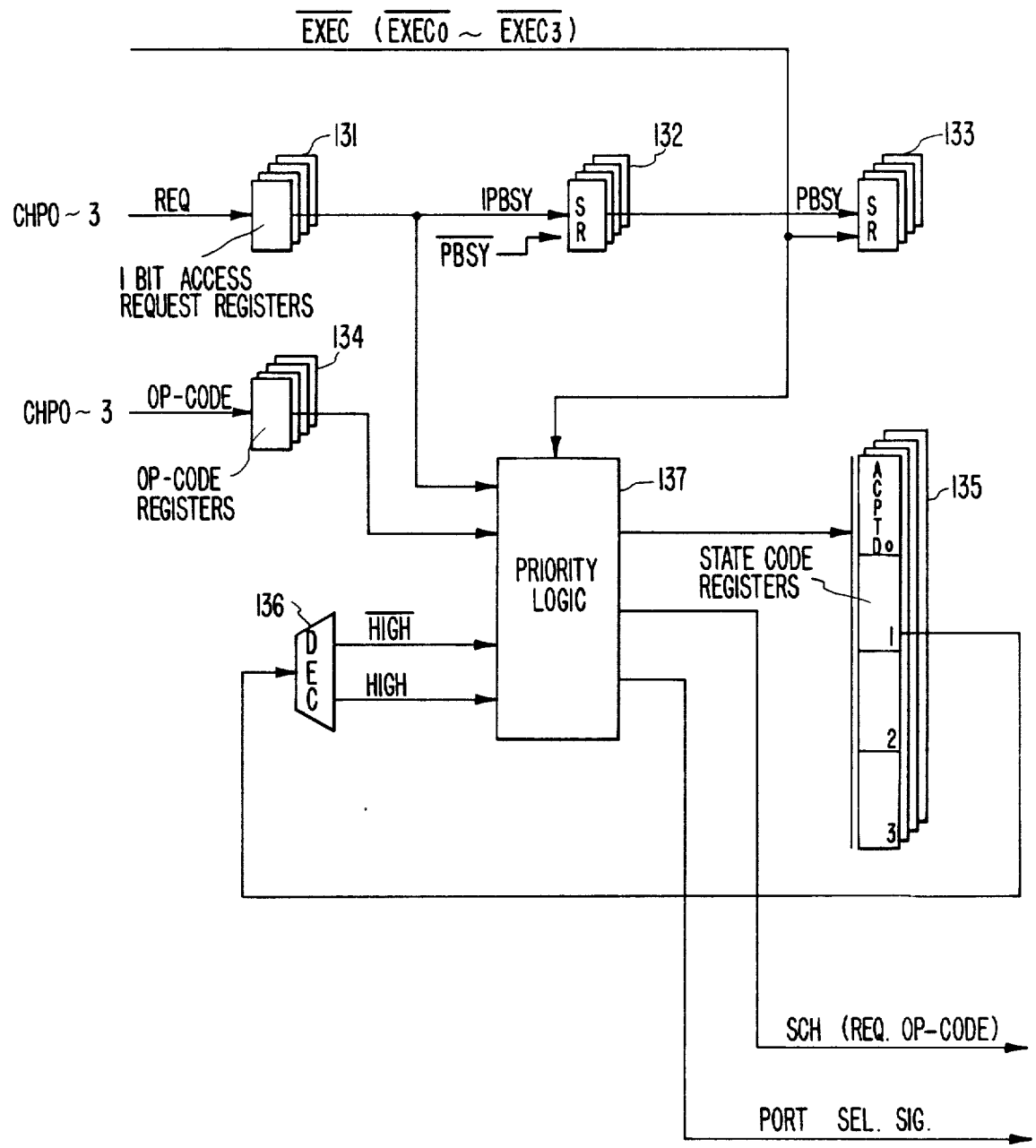
FIG. 6 is a detailed block diagram of a CHP priority determination circuit.

FIG. 6 is an embodiment of the internal circuit of the CHP priority determination circuit 13. Starting near the top, 131 is a 1-bit register which receives the request signal REQ from each CHP; 132 is a set-reset type flip-flop which receives the internal port busy signal IPBSY; 133 is a set-reset type flip-flop which receives a port busy signal PBSY; 134 is a register of multiple bits which receives the operation code from each CHP; 135 is a 4-bit register which holds the state indication bits ACPTD 0 to ACPTD 3, and 131, 133 and 135 correspond to the state indication register 13a shown in FIG. 3. Four of these registers and flip-flops are provided, one for each $CHP_0$ to $CHP_3$ 4. Block 136 is a decoder which decodes the contents of the indication register 135 and determines whether or not the priority has been raised to P HIGH. The priority logic circuit 137 sends the signal PORT SEL SIG for selecting any one of the CHP's in accordance with the output of these registers and the decoder, the REQ signal and OP Code for the selected CHP (SCH), and simultaneously controls the state of register 135 as explained with regards to FIG. 4. A practical circuit of the priority logic circuit 137 can be designed by those who are skilled in this art, based on the explanation of FIG. 4, and will therefore not be explained here. The PBSY flip-flop 133 is reset by the $\overline{EXEC}$ signal (actually, there are four signals $\overline{EXEC}$ 0 to $\overline{EXEC}$ 3 corresponding to the four CHP's). When PBSY is reset, the IPBSY flip-flop 132 is reset.

Figure 7:
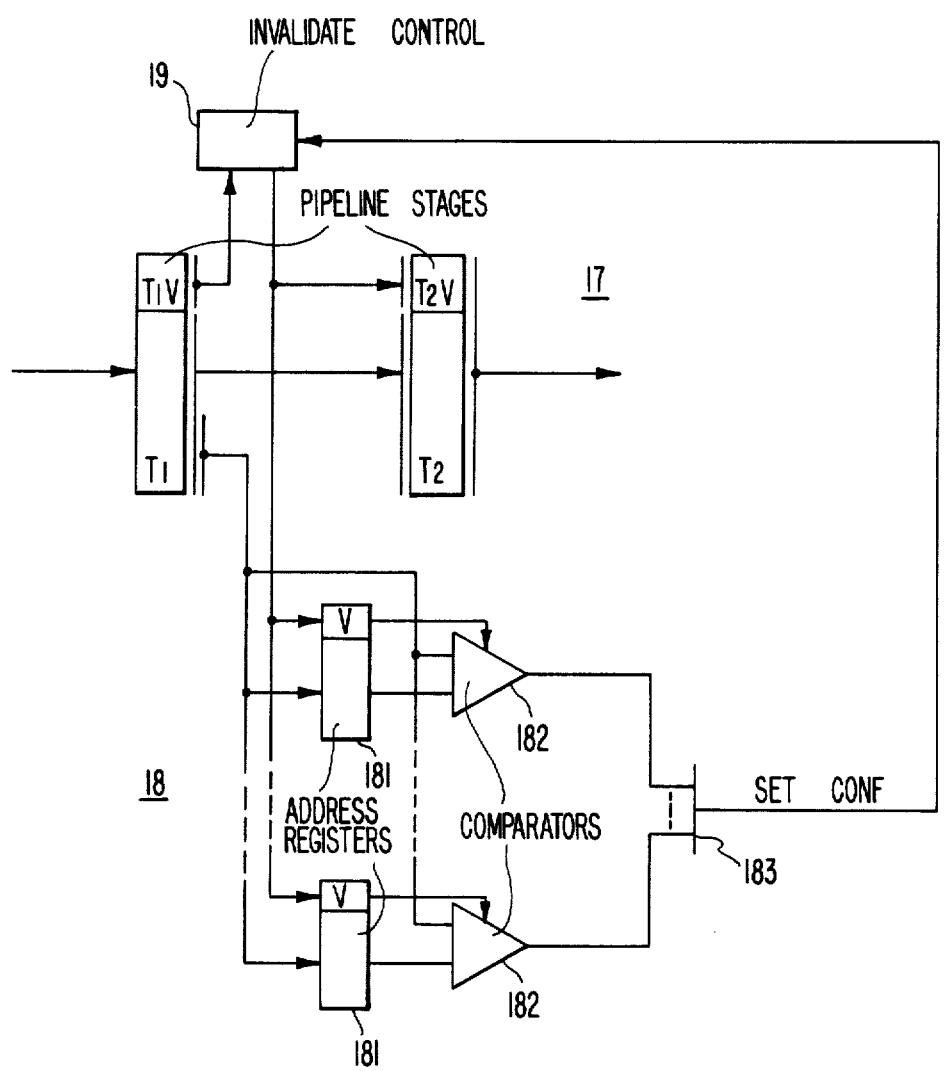
FIG. 7 is a detailed block diagram of a set conflict detection circuit.

FIG. 7 illustrates in detail the set conflict detection circuit 18 of FIG. 2, including a plurality of address registers 181 which receive the address information from the $T_1$ stage of the pipeline 17 and hold it until the end of the access to the buffer memory BS 7, a plurality of comparators 182 which compare the address of the register 181 and the address in the $T_1$ stage, and the OR gates 183 which ORs the outputs of the comparators 182. Each address register 181 provides the validity bit V and it is the same as that of the validity bit $T_2V$ of the access request in the $T_2$ stage of the pipeline 17. In other words, if a certain request is invalidated when it moves to $T_2$, there is no need of holding the address of such request in the register 181. The V bit of register 181 is reset when there is desired data in the BS 7 and its access is completed, or when there is not desired data in the BS, and an access is issued to the MSU 6.

Figure 8:
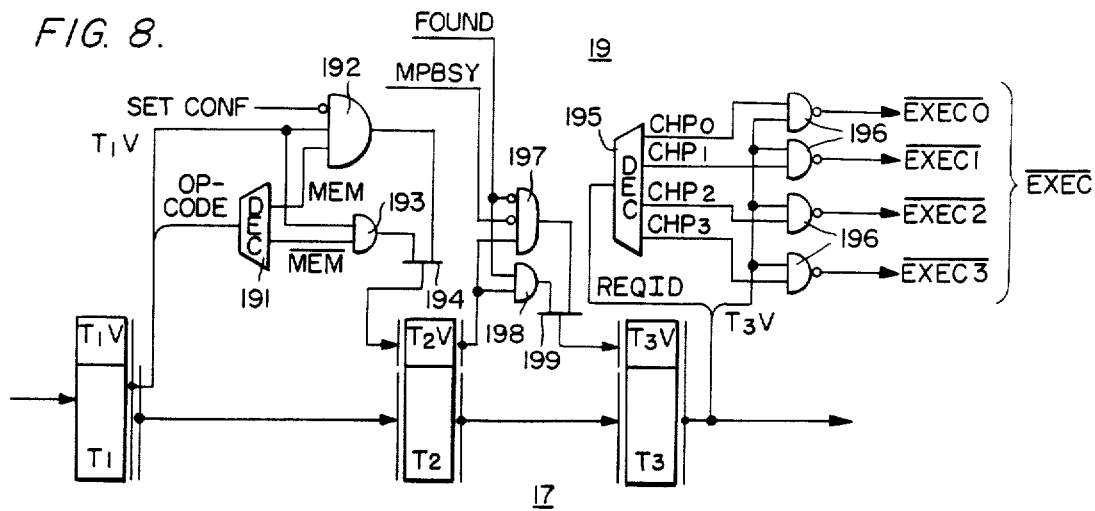
FIG. 8 is a detailed block diagram of a nullification control circuit for invalidation control.

FIG. 8 is the nullification control circuit 19 shown in FIG. 2. Block 191 is a decoder which decodes the operation (OP) code in the stage $T_1$ of the pipeline 17 and distinguishes the memory access request MEM from other requests $\overline{\text{MEM}}$ (for example, the transfer of control data from CPU to CHP). In the case of a memory access request MEM, $T_2V$ is set to "1" under the condition that there is no set conflict SET CONF and $T_1V$ is "1". If the request is not a memory access request $\overline{\text{MEM}}$, $T_2V$ has the same value as $T_1V$. In addition, when the desired data is FOUND in the BS 7, $T_2V$ can be transferred to $T_3V$, but when it is NOT FOUND in the BS 7, an MSU access is necessary and $T_2V$ is transferred to $T_3V$ only if the MSU port 21 is not busy.

Since there is no possibility of nullification in stages $T_3$ or later, the fact that $T_3V$ is turned ON means that normal processing is possible in the pipeline 17. On the contrary, when $T_3V$ is turned OFF, the unexecutable signal $\overline{\text{EXEC}}$ must be sent to the CHP priority determination circuit 13. In this case, the REQ ID in stage $T_3$ is decoded by the decoder 195, and one of $\overline{\text{EXEC}}$ 0 to $\overline{\text{EXEC}}$ 3 corresponding to $\text{CHP}_0$ 3 to $\text{CHP}_3$ 4 is output through the gate 196. Here, 192, 193, 197, 198 and 196 are AND gates, while 194 and 199 are OR gates.

The major access request operations incorporated in the MCU 5 will now be described prior to describing the functions of the main priority determination circuit 16.

ⓐ The access requests from a CHP include the 8-byte access of an 8-BYTE READ or WRITE.

ⓑ The access requests from a CPU include 8-BYTE STORE, a KEY operation, 64-BYTE READ BLOCK FETCH and 64-BYTE WRITE BLOCK STORE.

ⓒ The access requests of the loop-back LB generated in the MCU ⓢ include a PREFETCH which checks whether the next BLOCK to be accessed by a CPU or CHP is in the buffer memory BS 7 and if it is not, it is moved in from the main memory; ERROR LOOP BACK where an error is detected during processing and loop-back occurs for the post-processing; STORE LOOP BACK up-dating the BI FLAG indicating whether it is necessary to send the BIA on the occasion of selecting the BIA (BUFFER INVALIDATION ADDRESS), while the 8-BYTE STORE exists in the buffer memory BS 7; and move-in and move-out operations for sending and receiving data between the buffer memory BS 7 and main memory.

In the case of a BLOCK access by a CPU, the access request appears only once, but priority is obtained for each 8-BYTE access. Namely, after priority is obtained eight times in total, the processing of 1-BLOCK (64 bytes) is completed. Therefore, the BLOCK access of a PCU has basically the same processing as the 8-BYTE STORE and 8-BYTE access of a CHP, and is equvalent to executing an 8-BYTE access eight times.

If the way of obtaining priority for an access request is carefully modified considering the above operations, more efficient access request processing can be realized. The main priority determination circuit 16 is used for such processing and the algorithm of its modified processing is described below.

(1) When the first 8-BYTE/one-cycle of the BLOCK access request from a CPU and an SCH access request compete, the higher priority of the SCH is kept as it is and is not modified.

(2) When the second and successive 8-BYTE accesses of the BLOCK access request from a CPU (after obtaining priority for the first 8-BYTE/one-cycle) compete with an SCH access request, no priority is given to the SCH access request until all the 8-BYTE accesses of the BLOCK access request from the CPU are removed. Thereby, the BLOCK access, once started, is quickly completed and the load on the access request of a CPU is eased.

(3) The priority of the PREFETCH in loop-back is modified to be lower than that of an SCH access request because its importance is comparatively low. However, it must remain higher than the priority of unprocessed CPU access requests.

(4) The priority of an access request in loop-back LB, other than the PREFETCH, is higher than that of an SCH or CPU access request and should not be modified.

(5) When BLOCK access requests compete, a BLOCK access request with a hot and cold H/C flag bit 16a set to "1" has higher priority. Once a BLOCK access request obtains priority, no priority is given to another BLOCK access request until priority is given to all remaining 8-BYTE accesses of the BLOCK access request.

In the above access requests competing for priority, those which cannot obtain priority because of the reasons other than the priority formula, for example, in the case of memory access requests, those needing a bank of buffer memory BS 7 which conflicts with the preceding access request, are not considered. Therefore, once priority is obtained, the likelihood of being processed in the MCU 5 is great.

Figure 9:
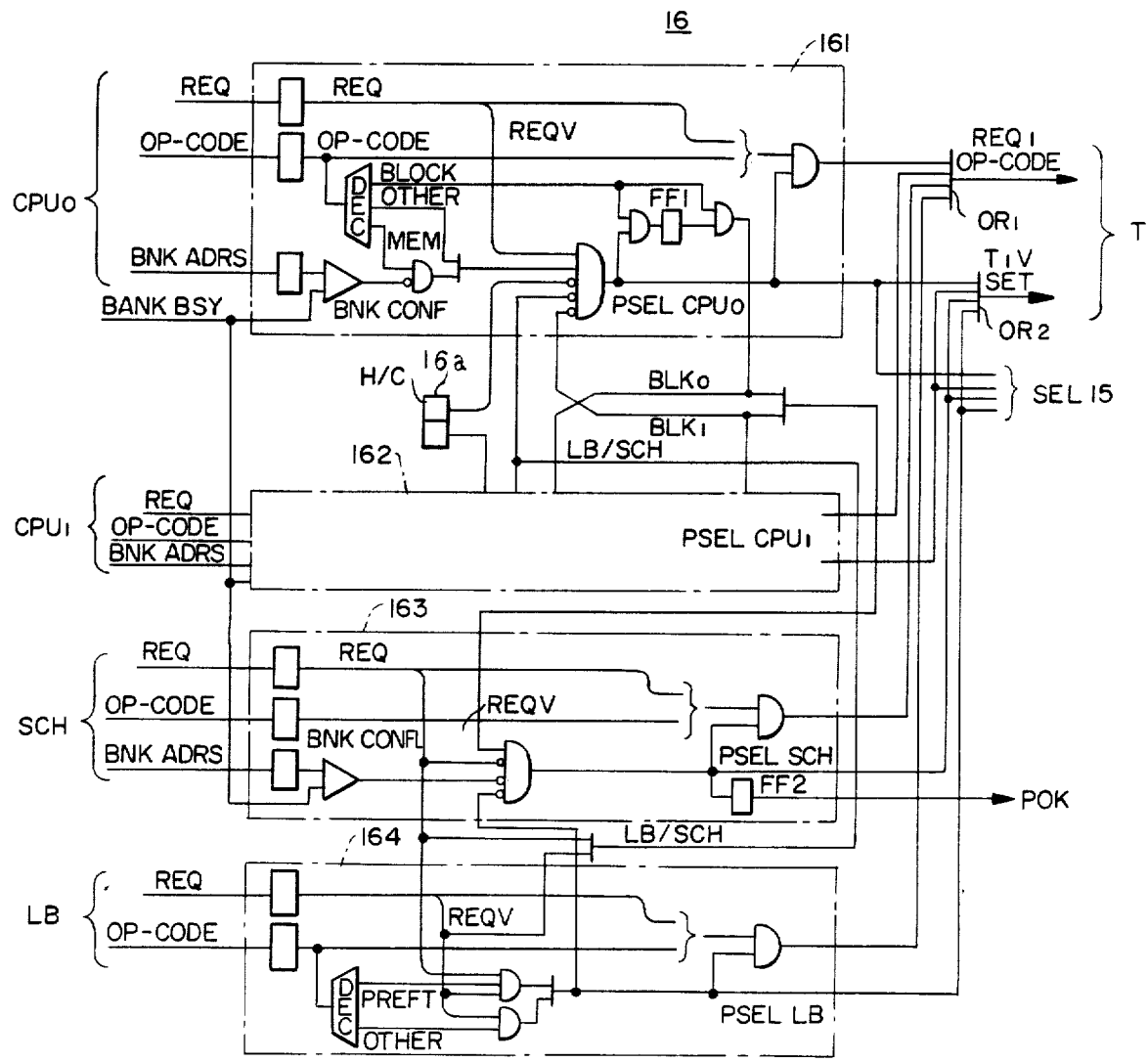
FIG. 9 is a detailed block diagram of a main priority determination circuit in an embodiment of the present invention.

FIG. 9 is a detailed block diagram of the main priority determination circuit 16. In this figure, 161 is a control circuit for $\text{CPU}_0$. First, the OP code is decoded and the block access request BLOCK, memory access request including block access request MEM and other access request OTHER are identified. In the case of a memory access request, the bank conflict is checked. Namely, it is checked whether the bank to be accessed is busy by checking the bank address BNK ADRS in the access requests address and the busy signal BANK BSY of the bank (not shown) of the BS 7. When it is busy (BNK CONF), such access request is not selected. In the case of a memory access request without bank conflict or an access request other than a memory access, when the validity bit REQV of the REQ is ON, the hot & cold flag H/C 16a is OFF, there is no request from the loop-back or a CHP access request ($\overline{\text{LBCH}}$) and the block access request is not being processed for $\text{CPU}_1$ 2 (BLK1), the selection signal PSEL CPU0 turns ON. When PSEL CPU0 turns ON, the REQ signal of $\text{CPU}_0$ and its OP code are selected and output. Moreover, when this access request is a block access request, FF1 is set by PSEL CPU0 and the signal BLK0 indicating a block access request is sent to the circuit 162.

The circuit 162 is a control circuit for $\text{CPU}_1$ 2 and its operation is the same as that of the circuit 161 and therefore it is not described. The H/C flag 16a is set when the access of $\text{CPU}_0$ completes and is reset when the access $\text{CPU}_1$ completes.

The circuit 163 is the control circuit for an SCH access request. Since a CHP allows only an 8-byte access request, the OP code is not decoded. When, there is no bank conflict, REQV is ON, there is no selection signal of loop-back (PSEL LB) and there is no block access request from $CPU_0$ 1 or $CPU_1$ 2, the selection signal PSEL SCH is turned ON. When PSEL SCH turns ON, the REQ of the SCH and its OP code are selected and output, and the signal POK is obtained by delaying PSEL SCH by one cycle in FF2.

The circuit 164 is a control circuit for loop-back. This circuit identifies the prefetch access request and other access requests by decoding the OP code. In the case of a prefetch access, PSEL LB turns ON only when the REQV of the SCH is OFF and the REQV of the LB is ON. In the case of other access requests, PSEL LB turns ON when the REQV of the LB is ON.

The REQ and OP-CODE outputs from the circuits 161 and 164 are connected to the $T_1$ stage of the pipeline through the OR gate OR1, while PSEL CPU0, PSEL CPU1, PSEL SCH and PSEL LB are connected to the $T_1V$ bit of the $T_1$ stage through the OR gate OR2. The above four PSEL signals are also connected to the selector 15 and there used for selection control.

As described above, according to the present invention, a CHP access request which has obtained priority but lost it is capable of encountering improved chances of re-execution and realizing smoother processing because it is given a higher priority than that of other CHP access requests during the repeated priority determined process. In addition, the priority determination is carried out with careful modification considering the operations from the point of view of hardware, instead of applying a fixed priority determination formula. Accordingly, access efficiency as a whole can be improved and the total processing time in the data processing system can be reduced.

What is claimed is:

1. An access request control apparatus for a pipeline control system connected to a memory apparatus and access request apparatuses including channel processing apparatuses (CHP's) and central processing units (CPU's) which together comprise a data processing system, said access request control apparatus processing channel and central access requests from the channel processing apparatuses and central processing units, respectively, to the memory apparatus, said access request control apparatus comprising:

accepting means, connected to the access request apparatuses, for accepting the access requests from the access request apparatuses;

determining means, connected to said accepting means, for determining priority of access requests which are simultaneously accepted from the plurality of access request apparatuses;

selection means, connected to said accepting means and said determining means, for selecting a selected channel access request in dependence upon the priority determined by said determining means from among the channel access requests accepted by said accepting means, and for selecting a selected access request from among the selected channel access request and the central access requests accepted by said accepting means with the selected channel access request assigned a first priority higher than a second priority assigned to the central access requests;

processing start means, connected to said selecting means and the pipeline control system, for starting processing of the selected access request;

nullification means, connected to the pipeline control system and said determining means, nullifying the selected access request if the processing of the selected access request cannot be completed, thereby producing a nullified access request; and return means, connected to the pipeline control system, said nullification means and said processing start means, for returning the nullified access request to said determining means via said accepting means, said determining means thereafter determining priority again, during which a third priority higher than the first priority is assigned to the nullified access request for competition with the accepted access requests.

2. An access request control apparatus according to claim 1, wherein said accepting means receives CPU access requests from the CPU's and CHP access requests from the CHP's, wherein said return means comprises a loop-back circuit, connected to the pipeline control system and said accepting means, for routing a loop-back (LB) access request from the pipeline control system to said accepting means, and wherein said selection means comprises a first priority determination circuit, connected to said accepting means, for selecting a selected CHP access request from among two or more of the CHP access requests; and a second priority determination circuit, connected to the pipeline control system, said loop-back circuit, said accepting means and said first priority determination circuit, having a CPU flag bit for selecting from among the selected CHP access request, the CPU access requests and the LB access request, assigning to the selected CHP access request a higher priority than that of the CPU access requests, and, when the CPU access requests compete, assigning the priority to the CPU access requests in accordance with the flag bit's indication of priority between the CPU access requests, and assigning the LB access request a highest priority, the selected CHP access request, if not selected by said second priority determination circuit, retaining the higher priority in said first priority determination circuit.

3. An access request control apparatus for a pipeline control system connected to a memory apparatus and access request apparatuses including channel processing apparatuses (CHP's) and central processing units (CPU's) which together comprise a data processing system, said access request control apparatus processing access requests from the access request apparatuses to the memory apparatus and comprising:

accepting means for receiving CPU access requests from he CPU's and CHP access requests from the CHP's;

a loop-back circuit, connected to the pipeline control system and said accepting means, for routing a loop-back (LB) access request from the pipeline control system to said accepting means;

a first priority determination circuit, connected to said accepting means, for selecting a selected CHP access request from among two or more of the CHP access requests; and a second priority determination circuit, connected to the pipeline control system, said loop-back circuit, said accepting means and said first priority determination circuit, having a CPU flag bit, for selecting from among the selected CHP access request, the CPU access requests and the LB access request, assigning to the selected CHP access request a higher priority than that of the CPU access requests, and, when the CPU access requests compete, assigning the higher priority in accordance with the flag bit's indication of priority between CPU access requests, and assigning to the LB access request a highest priority, the selected CHP access request, if not selected by said second priority determination circuit, retaining the higher priority in said priority determination circuit.

4. An access request control apparatus according to claim 3,
wherein each of the CHP's have a state, and
wherein said first priority determination circuit comprises a state indication register, connected to said accepting means, indicating the state of each of the CHP's, and said first priority determination circuit determines priority based on said state indication register's contents.

5. An access request control apparatus for a pipeline control system connected to a memory apparatus and access request apparatuses including channel processing apparatus (CHP's) and central processing units (CPU's) which together comprise a data processing system, the CHP's generating CHP access requests and CPU's generating CPU access requests having different kinds of operations, said access request control apparatus processing the access requests from the access request apparatuses to the memory apparatus by applying a priority determination formula, said access request control apparatus comprising:
a loop-back circuit, connected to the pipeline control system, for receiving loop back (LB) access requests which require processing through the pipeline control system more than once;
a first priority determination circuit, connected to the CHP's, for selecting a selected CHP access request from among two or more CHP access requests; and
a second priority determination circuit, connected to the CPU's, said loop-back circuit and said first priority determination circuit, for selecting from among the selected CHP access request, the CPU access requests and the LB access requests, said second priority determination circuit having a flag bit indicating priority between the CPU access requests, assigning to the selected CHP access request a first priority which is higher than that of the CPU access requests, assigning a second priority to the CPU access requests in accordance with the flag bit's indication of priority between the CPU access requests when the CPU access requests compete, and assigning to the LB access requests a third priority higher than that of the first and second priorities, said priority determination formula being modified in said second priority determination circuit in accordance with the kind of operation the CPU access requests are to perform.

6. An access request control apparatus according to claim 5,
wherein the CPU access requests include an n-byte access request and a block access request in which a first n-byte access request is carried out and then repeated for a second and successive times, where n is an integer larger than 1, and
wherein said second priority determination circuit assigns a fourth priority to the second and successive n-byte access requests of the block access request which is higher than the second priority assigned to the n-byte access request and the first n-byte access request of the block access request.

7. An access request control apparatus according to claim 6,
wherein said second priority determination circuit further comprises block access flags, each corresponding to one of the central processing units, and
wherein when said second priority determination circuit selects a selected block access request and begins processing the first n-byte access request of the selected block access request, the block access flag corresponding to the central processing unit from which said selected block access request was sent, is turned ON, indicating that the second and successive n-byte access requests of said selected block access request will receive the fourth priority.

8. An access request control device in a data processing system which includes a memory unit and access request devices which send access requests to said access request control device requesting access to the memory unit, said access request control device comprising:
priority control means, connected to the access request devices, for processing control of the access requests by assigning priority to access requests during acceptance by said access request control device;
selection means, connected to the access request devices and said priority control means, for selecting a selected access request from among the access requests accepted by said access request control device in dependence upon the priority assigned thereto and issuing the selected access request for processing;
nullification means, connected to said selection means via said priority control means, for nullifying the selected access request, if the selected access request cannot be fully processed, and then reassigning higher priority to access requests which have been nullified; and
access request pipeline processing means, connected to the memory unit, said priority control means, said selection means and said nullification means, for processing the selected access requests and returning access requests which have been nullified to said selection means.

9. An access request control device in a data processing system which includes a memory unit and access request devices, divided into a first access request group and a second access request group, which send access requests to said access request control device requesting access to the memory unit, said access request control device comprising:
access request pipeline processing means, connected to the memory unit, for processing the selected access requests, said access request pipeline processing means having an entrance and an exit, incompletely processed access requests being returned from the exit towards the entrance for reexecution;
first priority determination means, connected to the first access request group, for accepting one of the access requests at a time from each of the access request devices in the first access request group, selecting a first selected access request from among the access requests accepted from the first access request group and assigned a first priority to the first selected access request;

second priority determination means, connected to the second access request group, said first priority determination means and said access request pipeline processing means, for accepting one access request at a time from each of the access request devices in the second access request group, assigning a second priority to access requests accepted from the second access request group, assigning a third priority, different from the first and second priorities, to the incompletely processed access requests returned by said access request pipeline processing means, selecting a second selected access request from among the first selected access request, the access requests accepted from the second access request group and the incompletely processed access requests, and issuing said second selected access request to the entrance of said access request pipeline processing means for processing; and nullification control means, connected to said access request pipeline processing means and said first priority determination means, for nullifying access requests in said access request pipeline processing means which are unable to be completely processed.

10. An access request control device as set forth in claim 9, wherein said access request pipeline processing means comprises:

pipeline stages connected to the memory unit, said second priority determination means and said nullification control means; and a loop-back circuit, connected to said second priority determination means and said pipeline stages, for returning access requests which have not been fully processed to said second priority determination means.

11. An access request control device as set forth in claim 9, wherein the first priority is higher than the second priority and the third priority is higher than the first priority.

12. An access request control device as set forth in claim 9, wherein, when said first priority determination means selects the first selected access request, the access requests which previously have been assigned the first priority are selected before the access requests which have not been assigned priority.

13. An access request control device as set forth in claim 9, wherein the access requests have different types of operations and the first, second and third priorities have priority levels which depend upon the type of operation of the access requests.

14. An access request control device as set forth in claim 13, wherein the access requests include byte access requests, and block access requests which require the processing of a first byte access request and second and successive byte access requests, and wherein said second priority determination means assigns a fourth priority to the second and successive access requests of the block access request, the fourth priority having a level greater than the levels of the first and second priorities.

15. An access request control device as set forth in claim 14, wherein the access requests include a pre-fetch access request which may require the processing of second and successive byte access requests, and wherein said second priority determination means assigns to the pre-fetch access request a fifth priority having a level lower than the level of the first priority and higher than the level of the second priority.

16. A method for controlling access requests to a memory unit in a data processing system which includes first and second groups of access request devices generating access requests and an access request pipeline processing system, comprising the steps of:

(a) accepting access requests in means for accepting the access requests simultaneously from the access request devices;

(b) assigning priority in priority assigning means to access requests accepted in step (a);

(c) selecting in selection means one access request from among the access requests accepted in step (a) based upon the priority assigned in step (b);

(d) issuing from means for issuing the access request selected in step (c) to the access request pipeline processing system;

(e) discriminating in discrimination means whether access requests exiting the access request pipeline processing system are incomplete access requests for which execution is incomplete;

(f) reassigning in reassignment means a higher priority to the exiting incomplete access requests after said discriminating in step (e) discriminated the exiting incomplete access requests; and (g) repeating steps (a)–(f).

17. A method for controlling access requests as set forth in claim 16, wherein step (a) comprises the steps of:

(ai) accepting first accepted access requests from the first group of access request devices;

(aii) selecting a first selected access request from among the first accepted access requests and access requests from the first group of access request devices which were issued in step (d) but were not fully processed; and (aiii) accepting second accepted access requests from the second group of access request devices;

wherein step (b) comprises the steps of:

(bi) assigning a first priority to the first selected access request selected in step (aii); and (bii) assigning a second priority to the second accepted access requests accepted in step (aiii), wherein step (f) assigns a third priority to the access requests which have not been fully processed by the access request pipeline processing system, and wherein step (c) selects a second selected access request in dependence upon the first, second and third priorities.

18. A method for controlling requests in a data processing system as set forth in claim 17, wherein the first priority assigned in step (bi) has a level, the second priority assigned in step (bii) has a level which is lower than the level of the first priority and the third priority assigned in step (f) has a first level which is higher than the level of the first priority.

19. A method for controlling access requests in a data processing system as set forth in claim 18, wherein the access requests have different types of operations including a byte access request and a block access request having a first byte access and second and successive byte accesses, and wherein the byte access request and the first byte access of the block access request is assigned the second priority by step (bii) and the second and successive byte accesses of the block access request are assigned the first level of the third priority in step (f).

20. A method for processing access requests in a data processing system as set forth in claim 19, wherein the different types of operations of the access requests include a pre-fetch operation which may require second and successive byte accesses, and wherein the third priority assigned by step (f) has a second level, lower than the level of the first priority and higher than the level of the second priority, which is assigned to the second and successive byte accesses of the pre-fetch operation.

* * * * *

UNITED STATES PATENT AND TRADEMARK OFFICE
CERTIFICATE OF CORRECTION

PATENT NO. : 4,755,938

DATED : July 5, 1988

INVENTOR(S) : MASANORI TAKAHASHI et al.

It is certified that error appears in the above-identified patent and that said Letters Patent is hereby corrected as shown below:

Column 7, line 42, "⑤" should be --5--;
 line 60, "PCU" should be --CPU--.

Column 8, line 54, "(LBCH)" should be --(LB/SCH)--.

Column 10, line 57, "he" should be --the--.

Column 11, line 14, after "said" insert --first--.

Signed and Sealed this

Twenty-fifth Day of October, 1988

Attest:

DONALD J. QUIGG

Attesting Officer　　　　Commissioner of Patents and Trademarks